United States Patent [19]

Caulier

[11] 4,068,811
[45] Jan. 17, 1978

[54] HOTBOX DETECTOR

[75] Inventor: Paul W. Caulier, Greenwood, Va.

[73] Assignee: General Electric Company, Salem, Va.

[21] Appl. No.: 791,955

[22] Filed: Apr. 28, 1977

[51] Int. Cl.² ............................................. B61K 9/06
[52] U.S. Cl. ........................... 246/169 A; 73/355 R; 116/DIG. 38; 246/DIG. 2; 250/338; 340/228 R; 340/231; 340/269
[58] Field of Search ........ 246/169 A, 169 D, DIG. 1, 246/DIG. 2; 116/101, 114.5, DIG. 38; 340/227 R, 228 R, 231, 269; 250/338, 339, 340; 73/355 R

[56] References Cited

U.S. PATENT DOCUMENTS

| 2,920,485 | 1/1960 | Derganc | 246/DIG. 1 |
| 3,303,340 | 2/1967 | Hewett | 246/169 D |
| 3,999,069 | 12/1976 | Taylor | 250/338 |

*Primary Examiner*—Trygve M. Blix
*Assistant Examiner*—Reinhard J. Eisenzopf
*Attorney, Agent, or Firm*—Arnold E. Renner; Philip L. Schlamp

[57] ABSTRACT

An apparatus for determining the temperature of railroad car wheel journals (i.e., "hotbox" detector) includes a sensor including a pyroelectric cell responsive to infrared radiation signals, which are focused onto the cell, to output voltage signals as a function of the radiation signals inputted thereto. The sensor exhibits a nonlinear gain response to different frequencies of input signals and compensation is provided by coupling the output of the sensor to a differentiating circuit which has a similar but relatively negative gain response. The output of the differentiating circuit is a substantial voltage replica of the infrared input signal and this voltage signal may be applied to a suitable utilization device such as one which records journal temperature and/or provides a suitable alarm when a sensed journal temperature exceeds a predetermined value.

10 Claims, 9 Drawing Figures

HOTBOX DETECTOR

BACKGROUND OF THE INVENTION

The present invention relates generally to the determination of the temperature of railroad car wheel journals and more particularly to that class of devices generally known as "hotbox" detectors.

It is well known in the art to place detectors adjacent railroad tracks to identify overheated wheel journals. These detector devices generally include infrared sensitive elements which are focused to scan the journal box. The detector includes suitable circuitry to develop a signal which is representative of the journal temperature and this signal may be used in a variety of ways such as sounding an alarm in the event a signal indicates the temperature of a journal exceeds a predetermined value or to provide a visual recording of the temperature of each of the journals as the train passes the wayside station where the detector is located.

The most common form of hotbox detector in use today is the so-called bolometer type which will be described in some detail hereinafter. Briefly, however, the bolometer type hotbox detector uses temperature sensitive resistors (thermistors) in a bridge arrangement. While the performance of a bolometer type hotbox detector is, essentially, satisfactory, it is a relatively expensive apparatus. The thermistor is a very high resistance device and, therefore, requires a high voltage supply. Because of the bridge arrangement, the supplies must be very accurate and must not drift from their designated voltage. Because the signal-to-noise ratio of the bolometer decreases as the temperature decreases (at certain temperatures within the normal operating range of hotbox detector devices the ratio becomes unsatisfactory), heaters are required to maintain the ambient temperature of the thermistors above a predetermined minimum. In addition to the expense associated with the heaters, the use of heaters may require more elaborate optics as will be explained later. In addition, the frequency sensitivity of a bolometer type of system is not as broad as is desirable.

Other forms of infrared responsive devices are, of course, known. An example of one of these is the pyroelectric cell which outputs a charge in response to incident radiation in the infrared range. While pyroelectric cells overcome many if not all of the disadvantages of the bolometer system, they present certain problems of their own. Such cells are, generally, sensitive to shock and generate noise signals in response thereto. This, obviously, can be a problem when the device is located adjacent a railroad track. There are, however, materials which do not exhibit large shock-noise problems and with the use of suitable shock absorbing mountings this problem can be reduced to acceptable levels. A more serious problem is the fact that commercially available pyroelectric cells have an extremely poor gain response when considered over any sizable range of signal input frequencies. A typical infrared sensor employing a pyroelectric device has a flat or constant gain response only over about two percent of the frequency range required for good hotbox detector operation (e.g., 0.5 to 300 Hz). Thus, the pyroelectric cell without suitable compensating circuitry is an unsatisfactory substitute for the existing bolometer systems.

SUMMARY OF THE INVENTION

It is, therefore, an object of the present invention to provide an improved apparatus for determining the temperature or railroad car wheel journals.

Another object is to provide a high reliability, inexpensive hotbox detector.

A further object is to provide an economical hotbox detector operable with input signals occurring over a wide frequency range.

A still further object is to provide an improved circuit for use in a hotbox detector including sensor means having a pyroelectric device and additional circuitry to compensate for the nonlinearity of the sensor means.

The foregoing and other objects are achieved in accordance with the present invention by providing an apparatus for determining the temperature of railroad car wheel journals passing a given location which apparatus includes optical means for focusing the infrared signals originating at the wheel journal onto a suitable sensor means which includes a pyroelectric cell disposed at the focal point of the optical means. The sensor means exhibits a gain response which is substantially constant for infrared signals occurring at rates within the first range and further exhibits a gain response which varies exponentially in a first direction for infrared signals occurring at rates within a second range higher than but contiguous to the first range. The output of the sensor is applied to a differentiating means which exhibits a substantially flat or constant response within the first range and an exponentially varying gain response within the second range. The second range response varies at the same rate as that of the sensor means but in a direction opposite thereto. The output of the differentiating means is supplied to a suitable utilization device which may sound an alarm, record the signals received, etc.

BRIEF DESCRIPTION OF THE DRAWING

While the present invention is described in particularity in the claims annexed to and forming a part of this specification, a better understanding of the invention can be had by reference to the following description taken in conjunction with the accompanying drawing in which:

DETAILED DESCRIPTION

Figure 1:
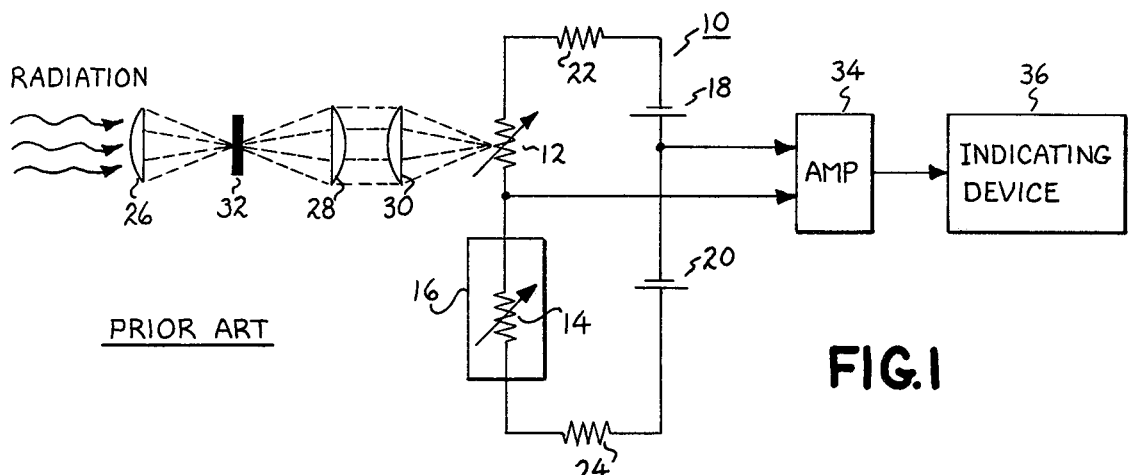
FIG. 1 is a schematic drawing, partially in block form, showing, in simplified form, a typical prior art hotbox detector.

Before proceeding with the description of the present invention, it is believed well to briefly explain the typical prior art hotbox detector so that a better understanding and appreciation of the present invention may be had. Referencing now FIG. 1, there is shown a typical bolometer hotbox detector in simplified form. The bolometer is included within a bridge shown generally at 10 and is comprised of a pair of thermal responsive resistors or thermistors 12 and 14. Thermistor 14 is shielded from incident radiation by way of suitable shielding means 16 so that, as will be more fully understood, radiation from the passing journal box affects only the resistance value of thermistor 12. The bridge further includes a pair of voltage sources indicated at 18 and 20 and a pair of current limiting resistors 22 and 24. Resistors 22 and 24 are located, respectively, between source 18 and thermistor 12 and source 20 and thermistor 14. Because the thermistors are high resistance devices (e.g., 2 megohms at 25° C), the voltage supplies which supply bias current to the termistors must be relatively high in order to get a usable signal. Typically, these voltage supplies would be 300 volts each. Resistors 22 and 24 are included to prevent what is commonly called "thermal runaway." Thermistors have an exponentially decreasing resistance with an increase in temperature and it is readily seen that, without appropriate limiting resistors, the $I^2R$ heating of the thermistors would tend to have a compounding effect. In that the thermistors are in a bridge arrangement, it is necessary that the two power supplies 18 and 20 be critically controlled in that any imbalance in the supplies will result in the development of a false or extraneous signal at the bridge output which is applied to an amplifier 34 as will be later described. It is possible to alleviate part of the above concerns by the replacement of the voltage supplies 18 and 20 by constant current sources but, as is well known in the art, precision constant current sources supplying higher voltages are relatively very expensive.

With regard now to the operation of the prior art system as shown in FIG. 1, incident radiation from a passing journal box is focused onto the unshielded thermistor 12 by way of a suitable optical system illustrated by the lenses 26, 28 and 30. As a result of this radiation, thermistor 12 is heated, decreasing its resistance and an imbalance will occur in the bridge resulting in a signal which is delivered to the amplifier 34. Amplifier 34 then outputs a signal to a suitable indicating device 36 which may be utilized to sound an alarm, record the value of the incident signal, etc. A reference shutter 32 may be positioned at the focal point of lens 26 to provide a suitable ambient temperature reference against which the system may operate. For a more complete explanation of this shutter and its operation, reference is made to U.S. Pat. No. 3,303,340, "Optical Arrangement In Hot Box Detection Apparatus" by M. W. Hewett et al. which patent issued on Feb. 7, 1967 and is assigned to the assignee of the present invention.

As previously mentioned, the bolometer system of FIG. 1 is a relatively expensive apparatus. The requirement of a high voltage (or constant current) and highly regulated power supplies has been previously mentioned. Because a hotbox detector system must be located adjacent a railroad track, it is subject to rather severe temperature extremes. A typical system is designed to operate properly in temperature range of from −40° C to +60° C. In that a signal-to-noise ratio of a typical bolometer system decreases rapidly as a function of decreasing temperature and generally becomes unsatisfactory below about 10° C, the usual system employs heaters (not shown) adjacent to each of the thermistors 12 and 14 to maintain these devices at at least a minimum temperature. These heaters, of course, represent additional expense. In addition, to the direct expense, there is a further expense occasioned by use of the heaters when a reference shutter is employed within the system. The reference shutter 32 is designed to block the optical path to the thermistor at all times except when a journal box is being scanned to provide the overall system with a temperature reference point. It is readily seen that, if the shutter 32 is located near the heaters associated with the thermistors 12 and 14, these heaters will in fact heat the shutter resulting in a false reference signal. Thus, the more elaborate lens system illustrated in FIG. 1 is provided to remove the shutter physically away from the thermistor 12 so that it will not be affected by the heaters.

One last point which needs elaboration concerns the previously mentioned fact that the bolometer system is extremely limited in frequency sensitivity and does not operate well when the radiation input signals exceed, for a good bolometer system, about 160 Hz. The frequency of input signals for a train passing at approximately 100 m.p.h. will be in the neighborhood of 100 Hz and this, of course, is the fundamental frequency and does not include harmonics. Good design practices indicate that at least a third harmonic should be considered and thus it is apparent that for trains which exceed speeds of apporoximately 67 m.p.h. the overall performance of the bolometer type system begins to degrade seriously.

As previously indicated, the advantages of pyroelectric cells to sense infrared radiation over the bolometer system just described are relatively well known. There exists, first of all, a much lower initial cost which is in the range of from one-fifth to one-half the cost of the bolometer; that is, the two thermistors. Because the pyroelectric cell is a charge generating device, large power supplies are not needed and the low impedance of this type of device, when used with an associated output circuit, does not require the impedance matching techniques and associated problems which are prevelant with the high impedance bolometer device. Because the signal-to-noise ratio over the required temperature operational range is substantially flat, it is not necessary to provide the heaters, thus, again reducing cost. The absence of the heaters permits the use of simpler optics in that a reference shutter may be located near or immediately adjacent the cell.

Figure 2:
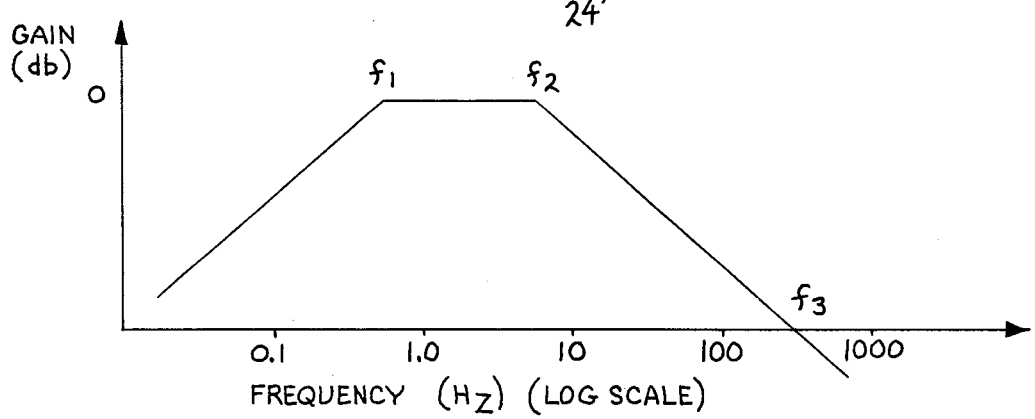
FIG. 2 is a graph illustrating the gain/frequency response to a typical commercially available infrared sensor employing a pyroelectric cell.
Figure 4A:
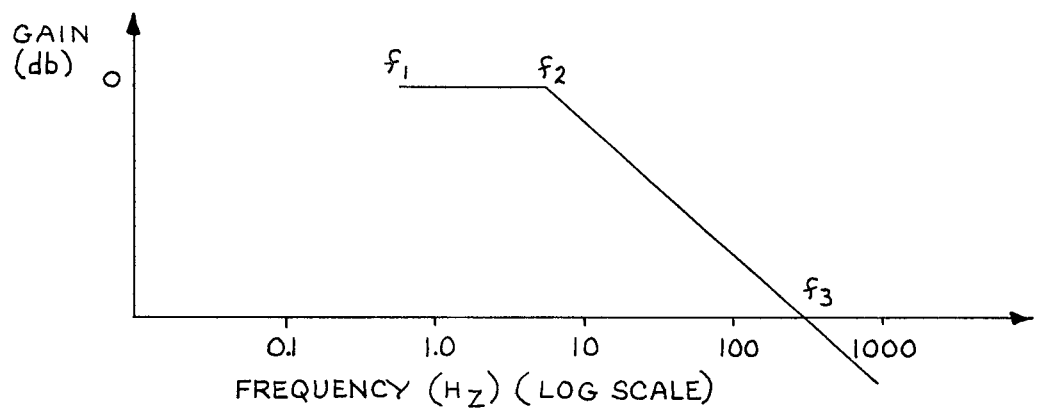
FIGS. 4a through 4c are graphs useful in the understanding of the present invention.
Figure 4B:
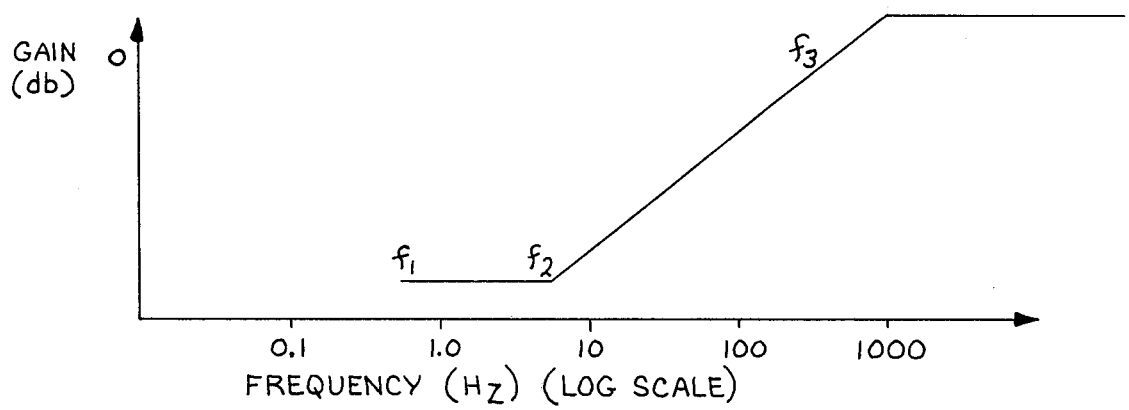
Figure 4C:
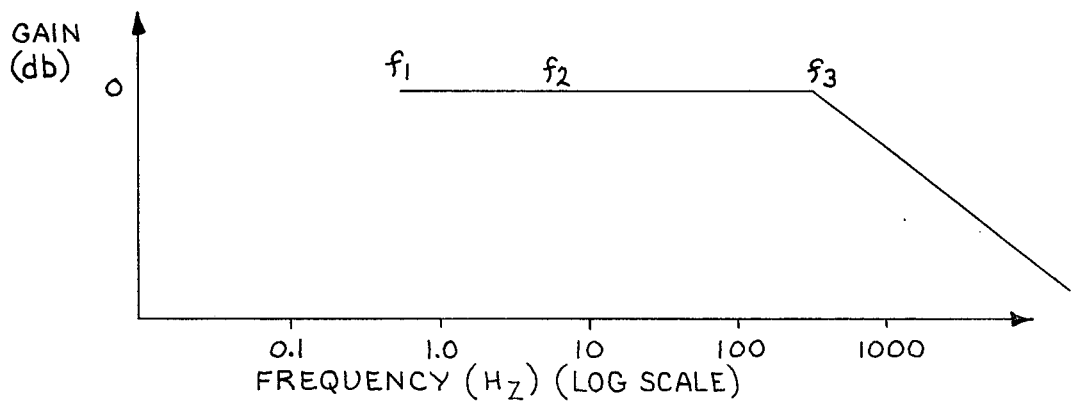

There does remain, however, the aforementioned problem that the pyroelectric sensor system exibits a flat gain response over a very narrow range of frequencies. This is illustrated in FIG. 2 which plots, for a typical pyroelectric sensor system, gain (in decibels) as the ordinate versus frequency (in Hertz) as the abscissa (on a logarithmic scale). (It is recognized that FIG. 2, as well as FIGS. 4a–4c, are idealized curves in that the breakpoints are not, in actuality, as sharp as there shown.) As illustrated in FIG. 2, the flat response portion, that is from $f_1$ to $f_2$, is only for about 6.3 Hz whereas, as previously indicated, it is desirable to operate a hotbox detector over a range much larger than this, for example from 0.5 to 300 Hz. At point $f_2$ there is a sharp downbreak such that the gain response for frequencies about $f_2$ the gain will decrease exponentially with an increase in frequency. Thus, it is evident that the pyroelectric sensor alone is not adequate for the needs of a hotbox detector.

Figure 3:
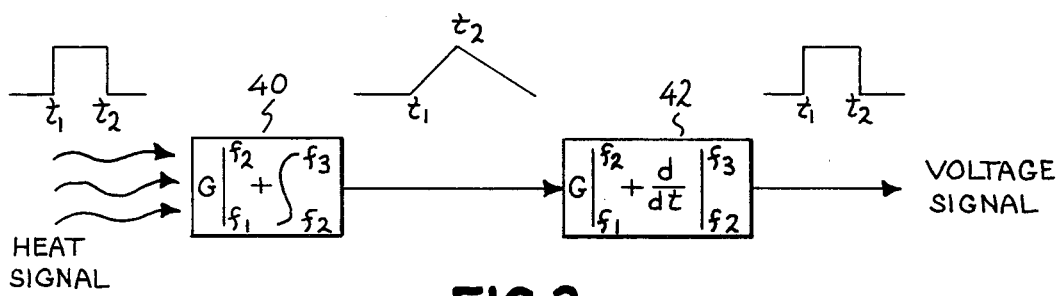
FIG. 3 is a functional block diagram illustrating the concept of the circuit of the present invention.

In accordance with the present invention, the deficiencies of the pyroelectric sensor are overcome and the means by which this is done is shown by the functional block diagram of FIG. 3. FIG. 3 shows, as an input to a first block 40, a step form heat signal occurring between the times $t_1$ and $t_2$. Block 40 is shown as having a constant gain in frequency range of $f_1$ to $f_2$ plus an integrating gain function in frequency range of $f_2$ to $f_3$ and thus corresponds to the FIG. 2 depiction. The output of block 40 is, as indicated, a signal which integrates upwardly from $t_1$ to $t_2$ and downwardly thereafter. The signal from block 40 is applied as an input to another functional block 42 which has a constant gain in the frequency range of $f_1$ to $f_2$ plus a differentiating mode of operation within the frequency range $f_2$ to $f_3$. The output signal from block 42 is a voltage signal which is, substantially, a voltage replica of the heat input signal.

The overall operation of the system of the present invention is graphically illustrated in FIGS. 4a through 4c. As in FIG. 2, each of these figures plots gain (db) versus frequency (Hz). FIG. 4a shows the response of the pyroelectric sensor (block 40 of FIG. 3) in the frequency range of from $f_1$ to $f_3$, the range of interest. FIG. 4b shows the plot of a suitable differentiator (block 42 of FIG. 3) in that same range and shows a flat respnse in the frequency range of $f_1$ to $f_2$ and a gain which varies at the same rate but in the opposite direction as the integrator of block 40 in the range from $f_2$ to $f_3$. By combining the two signals represented by the graphs of 4a and 4b, it is seen (FIG. 4c) that the output is a constant gain within the frequency range bounded by the frequencies $f_1$ and $f_3$, the frequency range in which the present invention is designed to operate, such that the system of the present invention will truly output a voltage signal which is a substantial replica of the heat input signal.

Figure 5:
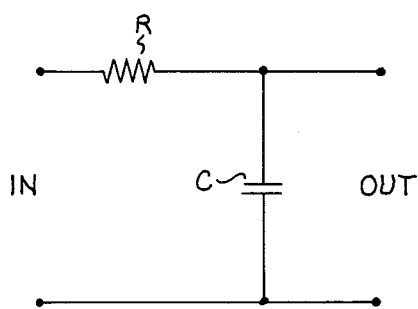
FIG. 5 is a schematic drawing illustrating the electrical equivalent of the sensor means utilized in the present invention.

FIG. 5 shows an equivalent electrical circuit which can be derived from the graphs of either FIG. 2 or FIG. 4a within the frequency range $f_1$ to $f_3$. This equivalent is comprised of a simple integrating circuit comprising a resistor R and a capacitor C in a manner well known in the art. If R and C represent, respectively, the values of these equivalent components, then the transfer function, F, of that circuit can be expressed by the equation $F = 1/(1 + j\omega RC)$.

Figure 6:
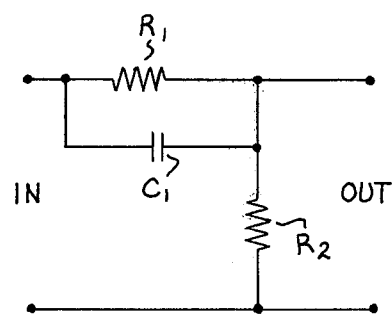
FIG. 6 is a schematic drawing illustrating a first embodiment of a differentiating means for use in the present invention; and, FIG. 7 is a schematic drawing illustrating the present invention in its preferred embodiment.

FIG. 6 represents a possible differentiating circuit for block 42 which can be derived from the graph of FIG. 4b. This circuit is comprised of a first resistor $R_1$ is parallel with a capacitor $C_1$ with the combination being in series between the input and the output. A second resistor $R_2$ is connected to the junction of $R_1$ and $C_1$ to the other line. The transfer function, $F_1$, of this circuit may be expressed as $$F_1 = \frac{R_2}{R_1 + R_2} \cdot \frac{1 + j\omega R_1 C_1}{1 + j\omega C_1 \cdot \frac{R_1 \cdot R_2}{R_1 + R_2}}$$

In that FIG. 5 represents the sensor means in the range $f_2$-$f_3$ and its output forms the input to the differentiating circuit of FIG. 6, it is readily seen from FIG. 3 that the output of FIG. 6 will be a pulsed voltage replica of the step pulsed heat signal input to the circuit of FIG. 3.

Figure 7:
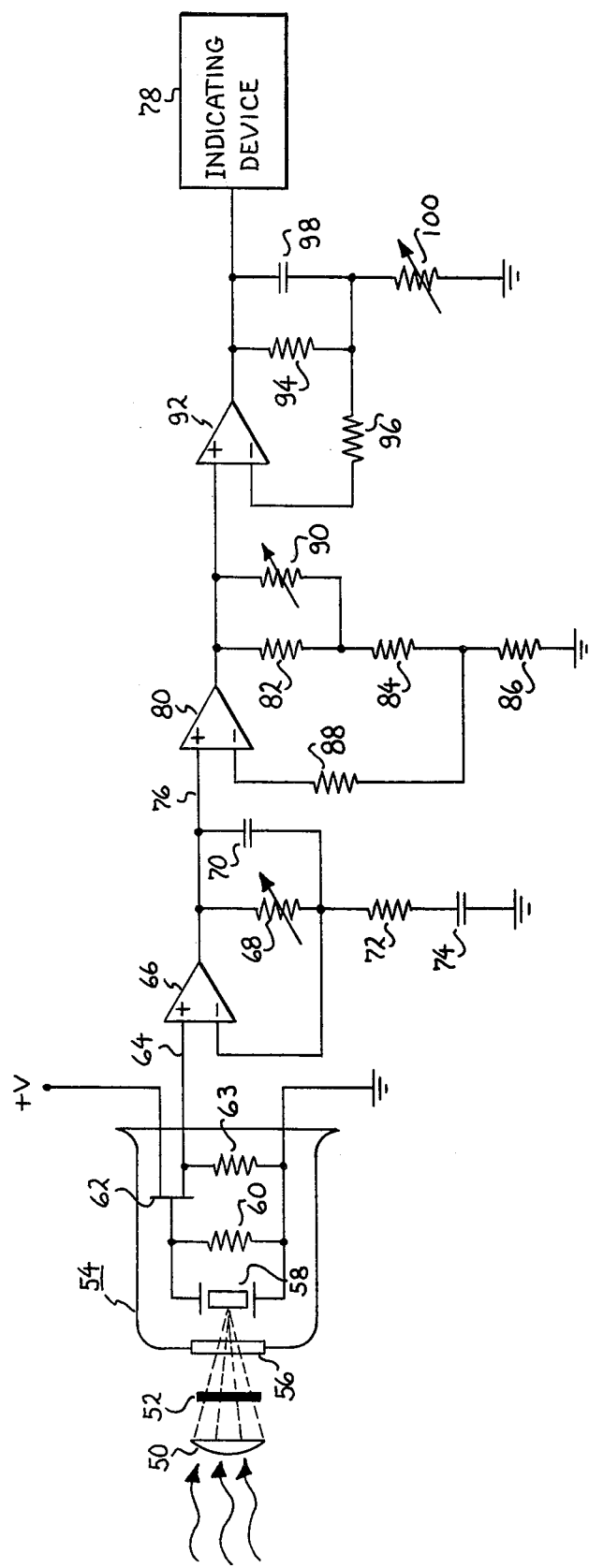

While the first embodiment of the invention as depicted by FIGS. 3, 5 and 6, is operative and will, in fact, provide the desired results, it was found to be inclusive of certain disadvantages primarily in that the fact that the differentiating circuit made up of discrete components such as shown in FIG. 6 has a tendency to attenuate the signals and thus a relatively large amplification resulting in a lower signal-to-noise ratio is required at the output of FIG. 6 in order to bring the output to usable magnitudes. The preferred embodiment of the invention was, therefore, implemented using operational amplifiers as is illustrated more fully in FIG. 7. As shown in FIG. 7, incident radiation is applied by way of a single lens 50 and a reference shutter 52 to a sensing means indicated generally at 54. From the previous discussion it will be remembered that because no heater is required in the present invention, the optics can be simplified and a single lens system may be used here. The reference shutter 52 operates in the same manner as was previously described with respect to the prior art. The sensing means 54 in the embodiment of the invention actually implemented was a vendor purchased item identified as a P1-50 Detector/Amplifier sold by Molectron Corporation of Sunnyvale, Calif. The sensor means, as shown, includes an infrared transparent window 56, which may be of germanium, and a suitable pyroelectric cell 58 which may be of lithium tantalate. Connected in parallel with the cell 58 in a high resistance resistor 60 and one end of the cell is connected to the gate of a suitable switching means which is in this particular device a field effect transistor (FET) 62. The FET is connected in the source follower mode so as to have the gain of 1 and thus has its drain connected to a source of constant potential indicated as $+V$ (e.g., +9 volts) and its source connected to ground by way of suitable resistor 63 which would be small in comparison to the value of the resistor 60. The sensor means 54 outputs a signal by way of a line 64 which is the equivalent of the output of the integrating circuit shown in FIG. 5 over the frequency range $f_2$-$f_3$.

The output of this sensor, by way of line 64, is applied to the noninverting input of an operational amplifier 66 which, with its related components, comprises a differentiating amplifier of the general type known in the art. Amplifier 66 has a first feedback path from its output to its inverting input which includes a resistor 68 (shown variable) and a second feedback path by way of a capacitor 70. A second resistor 72 is connected in series with a capacitor 74 between ground and the junction of the resistor 68 and the capacitor 70. Resistor 68 is made variable only for purposes of matching the break point of the differentiating amplifier 66 to the particular sensor means involved to allow for slight variances in the sensors. Capacitor 70 acts strictly as a transient suppressor to give the amplifier a unity gain for very high frequencies and thus does not enter into the normal operation of the amplifier. The differentiating amplifier as represented by the operational amplifier 66, resistors 68 and 72 and the capacitor 74 functions essentially as follows. With a d.c. input, capacitor 74 acts as an open circuit and the amplifier will have a unity gain and the output as seen on line 76 will follow the input. As the frequency of the input signal on line 64 increases, the impedance of the path including resistor 72 and capacitor 74 will decrease and the gain of the amplifier will increase. Thus, it is seen that the transfer characteristic of the differentiating amplifier 66 and the associated components will be essentially the same as that of the circuit of FIG. 6 and that which is illustrated in FIG. 4b. That is, there will be a substantially flat response at low frequencies and at higher frequencies the gain of the differentiating amplifier will increase. As is further illustrated in FIG. 4b, when the frequency reaches a high enough plateau, capacitor 74 will act as a short circuit and the gain of the amplifier 66 will be fixed by the values of the resistors 68 and 72. This is illustrated at the second breakpoint immediately adjacent the frequency $f_3$. Thus, it is seen that the output of the operational amplifier 66 as it appears on line 76 will be a voltage replica of the heat input signal applied to the sensor means 54. This signal may be supplied by a suitable indicating device 78 to perform any of the known functions such as sounding an alarm, driving a recorder, etc.

Although not directly forming a part of the invention, for purposes of completeness, FIG. 7 further includes two amplifier stages connected in cascade between the output of the amplifier 66 (line 76) and an indicating device 78. The first amplifying stage comprises an operational amplifier 80 to which the signal on line 76 is applied by way of the noninverting input. A feedback path comprising a voltage divider consisting of three series connected resistors 82, 84 and 86 is connected between the output of the amplifier 80 and ground. An additional resistor 88 is connected between the junction of resistors 84 and 86 and the inverting input of the amplifier 80. A fifth resistor 90 is shown connected in parallel with the resistor 82. This resistor, in the preferred embodiment, is a small thermistor whose value varies as the ambient temperature varies and thus provides temperature compensation to the overall system.

The last depiction of FIG. 7 is a second amplifier stage including an operational amplifier 92 which receives as its noninverting input the output of amplifier 80. A feedback path from the output of amplifier 92 to its inverting input includes a series combination of two resistors 94 and 96. For transient signal suppression, a capacitor 98 may be connected in parallel with the resistor 94. A further resistor 100 may be connected between the junction of resistor 94 and capacitor 98 and ground. If desired, and as indicated, resistor 100 may be made variable to thereby permit adjustment of the gain of the amplifier 92 and serve as a means of adjusting the overall gain of this system.

In summary, as shown in the preferred embodiment of FIG. 7, the infrared input signal is applied by way of the lens 50 to the sensing means 54 which outputs the signal depicted in FIG. 4a to a differentiating amplifying means represented by the operational amplifier 66 and its related components. The response curve of the differentiating amplifier is shown in FIG. 4b and the output of this amplifier as seen on line 76 is substantially a flat response within the desired frequency range of $f_1$ to $f_3$ as shown in FIG. 4c. Suitable temperature compensation and amplification is provided by additional stages and there is further included a suitable indicating device as previously described for the utilization of the signal.

Thus, it is seen that there has been provided a relatively inexpensive and extremely accurate hotbox detector system which is stable and relatively linear over the desired operating range. While there have been shown and described what are at present considered to be the preferred embodiments of the present invention, modifications thereto will readily occur to those skilled in the art. It is not desired, therefore, that the invention be limited to the specific circuits shown and described and it is intended to cover, in the appended claims all such modifications as fall within the true spirit and scope of the invention.

What is claimed is:

1. An improved circuit for use in apparatus for detecting the temperature of railroad car wheel journals as a train passes a fixed wayside point whereby infrared signals are transmitted from the wheel journals to the apparatus at a frequency corresponding to the rate at which said wheels pass said wayside point, said circuit comprising:
   a. sensor means including a pyroelectric cell for outputting a voltage signal having a magnitude which is a function of the infrared input signals applied thereto, said sensor means exhibiting a substantially flat gain response to input signals occurring at frequencies within a first range and a gain response which varies exponentially with an increase in the frequency of the input signals within a second range of frequencies higher than said first range; and,
   b. differentiating means responsive to the output of said sensor means to output a voltage signal having a magnitude porportional to the temperature of the wheel journal, said differentiating means having a substantially flat gain response to signals having a frequency within said first range and a gain response within said second range which varies exponentially at the same rate but in a direction opposite to that of said sensor means.

2. The invention in accordance with claim 1 wherein said sensor means includes means to effect a gain response in said second range which decreases.

3. The invention in accordance with claim 2 wherein said sensor means acts as an integrator within said second range of frequencies and is the electrical equivalent of a resistance-capacitance network having a resistor of a value $R$ and a capacitor of a value $C$, said network having a transfer function $F$ defined generally by the expression:

$$F = \frac{1}{1 + j\omega RC}$$

and wherein said differentiating means is a resistance-capacitance network having resistors of values $R_1$ and $R_2$ and a capacitor of a value $C_1$ and having a transfer function $F_1$ defined generally by the expression:

$$F_1 = \frac{R_2}{R_1 + R_2} \cdot \frac{1 + j\omega R_1 C_1}{1 + j\omega C_1 \cdot \frac{R_1 \cdot R_2}{R_1 + R_2}}$$

4. The invention in accordance with claim 2 wherein said differentiating means comprises an operational amplifier having a feedback path between its output and an input thereof, said feedback path including resistive and capacitive components.

5. The invention in accordance with claim 1 wherein said first and second frequency ranges have a common boundary.

6. An improved circuit for use in apparatus for detecting overheated journals in railroad cars comprising:
   a. sensor means including a pyroelectric cell for outputting a voltage signal in response to infrared radiation signals inputted thereto, said sensor means exhibiting a substantially flat gain response to input signals occurring within a first frequency range and a gain response which decreases exponentially with increasingly higher frequencies within a second frequency range of higher frequencies than those of said first range; and,
b. differentiating means coupled to the output of said sensor means, said differentiating means having a substantially flat gain response to input signals having a frequency within said first range and a gain response to input signals within said second range which increases exponentially, with increasing frequencies, at substantially the same rate as the gain of said sensor means decreases whereby the output of said differentiating means is substantially a voltage representation of the infrared signals inputted to said sensor means.

7. The invention in accordance with claim 6 wherein said sensor means acts as an integrator within said second range of frequencies and is the electrical equivalent of a resistance-capacitance netowrk having a resistor of a value $R$ and a capacitor of a value $C$, said network having a transfer function $F$ defined generally by the expression:

$$F = \frac{1}{1 + j\omega RC}$$

and wherein said differentiating means is a resistance-capacitance network having resistors of values $R_1$ and $R_2$ and a capacitor of a value $C_1$ and having a transfer function $F_1$ defined generally by the expression:

$$F_1 = \frac{R_2}{R_1 + R_2} \cdot \frac{1 + j\omega R_1 C_1}{1 + j\omega C_1 \cdot \frac{R_1 \cdot R_2}{R_1 + R_2}}$$

8. The invention in accordance with claim 6 wherein said differentiating means comprises an operational amplifier having a feedback path between its output and an input thereof, said feedback path including resistive and capacitive components.

9. The invention in accordance with claim 6 wherein said first and second frequency ranges are contiguous.

10. An apparatus for determining the temperature of railroad car wheel journals passing a location comprising:
a. optical means for focusing infrared signals originating at passing wheel journals at a point;
b. sensor means, including a pyroelectric cell disposed at the focal point of said optical means, for producing first voltage signals as a function of the infrared radiation impinging upon said cell, said sensor means exhibiting a gain response which is substantially constant for infrared signals occurring at rates within a first range and exhibiting a gain response which varies exponentially in a first direction for infrared signals occurring at rates within a second range higher than and contiguous to said first range;
c. differentiating means responsive to said first voltage signals from said sensor means to output second voltage signals representative of said infrared signals, said differentiating means having a substantially flat gain response for input signals occurring at rates within said first range and a gain response for signals occurring at rates within said second range which varies exponentially at the same rate but in a direction opposite to that of said sensor means; and,
d. means responsive to said second voltage signals to at least provide an indication of when said infrared signals impingent on said pyroelectric cell indicate that the wheel journals are at a temperature exceeding a predetermined value.

* * * * *